United States Patent
Tang et al.

(10) Patent No.: US 12,541,556 B2
(45) Date of Patent: Feb. 3, 2026

(54) DISTRIBUTED GRAPH EMBEDDING-BASED FEDERATED GRAPH CLUSTERING METHOD, APPARATUS, AND READABLE STORAGE MEDIUM

(71) Applicant: CHINA UNIONPAY CO., LTD., Shanghai (CN)

(72) Inventors: Tao Tang, Shanghai (CN); Ying Chen, Shanghai (CN); Pengfei Gao, Shanghai (CN); Yue Pang, Shanghai (CN); Jianbin Zheng, Shanghai (CN); Hongbao Liu, Shanghai (CN); Jing Pan, Shanghai (CN); Yongkai Zhou, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/833,611

(22) PCT Filed: Sep. 7, 2022

(86) PCT No.: PCT/CN2022/117418
§ 371 (c)(1),
(2) Date: Jul. 26, 2024

(87) PCT Pub. No.: WO2023/142490
PCT Pub. Date: Aug. 3, 2023

(65) Prior Publication Data
US 2025/0148011 A1    May 8, 2025

(30) Foreign Application Priority Data
Jan. 28, 2022    (CN) .......................... 202210106101.1

(51) Int. Cl.
*G06F 16/901*    (2019.01)
*G06F 16/28*    (2019.01)

(52) U.S. Cl.
CPC ........ *G06F 16/9024* (2019.01); *G06F 16/285* (2019.01)

(58) Field of Classification Search
CPC .................................................... G06F 16/285
See application file for complete search history.

(56) References Cited

U.S. PATENT DOCUMENTS 9,064,002 B1 *   6/2015  Gyongyi ............... G06F 16/285
11,671,434 B2    6/2023  Gu
(Continued)

FOREIGN PATENT DOCUMENTS

| CN | 111178515 A | 5/2020 |
| CN | 111553470 A | 8/2020 |

(Continued)

OTHER PUBLICATIONS

International Application No. PCT/CN2022/117418, International Search Report, mailed Nov. 25, 2022.
(Continued)

*Primary Examiner* — Apu M Mofiz
*Assistant Examiner* — Farhad Agharahimi
(74) *Attorney, Agent, or Firm* — MARSHALL, GERSTEIN & BORUN LLP

(57) ABSTRACT

Provided are a federated graph clustering method based on distributed graph embedding, a device, and a readable storage medium. The method comprises: constructing a first graph on the basis of first party data, and constructing a second graph on the basis of second party data; performing an encrypted intersection on the first party data and the second party data, determining common nodes in the first graph and the second graph, and associating the first graph with the second graph according to the common nodes to obtain a federated graph; learning on the federated graph by using a random walk-based distributed graph embedding (Continued)

algorithm, and determining a first graph embedding vector [PiA, PiB] starting from the first graph and a second graph embedding vector [PiA', PiB'] starting from the second graph; and performing a clustering analysis on the first graph embedding vector [PiA, PiB] and the second graph embedding vector [PiA', PiB'] of the federated graph on the basis of a federated clustering method to obtain a clustering result. By utilizing the present method, federated graph clustering can be carried out on private data of two parties, and a better clustering effect is obtained.

17 Claims, 5 Drawing Sheets

(56) References Cited

U.S. PATENT DOCUMENTS

| | | | |
|---|---|---|---|
| 2020/0342006 | A1 | 10/2020 | Rossi et al. |
| 2020/0357031 | A1* | 11/2020 | Schroepfer ........ G06Q 30/0605 |
| 2021/0048994 | A1* | 2/2021 | Yu ........................... G06F 21/57 |
| 2021/0049209 | A1 | 2/2021 | Shi |
| 2021/0243212 | A1* | 8/2021 | Bowman ................ G06N 5/022 |
| 2022/0004546 | A1* | 1/2022 | Rogers ................. G06F 16/245 |

FOREIGN PATENT DOCUMENTS

| | | |
|---|---|---|
| CN | 112182399 A | 1/2021 |
| CN | 112200263 A | 1/2021 |
| CN | 112288094 A | 1/2021 |
| CN | 113076422 A | 7/2021 |
| CN | 113298267 A | 8/2021 |
| CN | 114492647 A | 5/2022 |
| JP | 2019-133556 A | 8/2019 |
| JP | 2021-517295 A | 7/2021 |
| JP | 2021-524091 A | 9/2021 |
| WO | WO-2019/178155 A1 | 9/2019 |

OTHER PUBLICATIONS

International Application No. PCT/CN2022/117418, Written Opinion, mailed Nov. 25, 2022.
Japanese Patent Application No. 2024-536251, Notice of Reasons for Refusal, dated May 23, 2025.

* cited by examiner

DISTRIBUTED GRAPH EMBEDDING-BASED FEDERATED GRAPH CLUSTERING METHOD, APPARATUS, AND READABLE STORAGE MEDIUM

CROSS-REFERENCE TO RELATED APPLICATION

This application is a U.S. national stage of International Application No. PCT/CN2022/117418, titled "FEDERATED GRAPH CLUSTERING METHOD BASED ON DISTRIBUTED GRAPH EMBEDDING, APPARATUS, AND READABLE STORAGE MEDIUM", filed on Sep. 7, 2022, and claims priority to Chinese Patent Application No. 202210106101.1, entitled "FEDERATED GRAPH CLUSTERING METHOD BASED ON DISTRIBUTED GRAPH EMBEDDING, APPARATUS, AND READABLE STORAGE MEDIUM" and filed on Jan. 28, 2022, the disclosures of which are incorporated herein by reference in their entirety for all purposes.

TECHNICAL FIELD

This application belongs to the field of clustering, and specifically relates to a distributed graph embedding-based federated graph clustering method, a device, and a readable storage medium.

BACKGROUND

This section is intended to provide background or context for embodiments of this application recited in the claims. The description herein is not admitted as prior art by virtue of its inclusion in this section.

Currently, federated learning technology has relatively high application potential for joint use of data where the data does not leave the database and the mining of the value of multi-party data, but supported algorithms mainly are conventional classification models, regression models, and the like, in machine learning, which are focused on the evaluation of individual's value portrait while comparatively lack the mining of potential organized behaviors, meanwhile since graph computing involves multiple rounds of topology interaction computation of the multi-party data, currently the research for the development of a privacy computation-based graph mining algorithm is relatively weak with fewer industry results.

Therefore, a privacy graph structure-based federated learning is one urgent problem to be solved.

SUMMARY

A distributed graph embedding-based federated graph clustering method, a device, and a readable storage medium are provided with respect to the problems existed in the prior art described above, and the problems set forth above can be solved by using such a method, a device, and a computer-readable storage medium.

This application has provided following schemes.

In a first aspect, a distributed graph embedding-based federated graph clustering method is provided, including: constructing a first graph on the basis of a first party data, and constructing a second graph on the basis of a second party data; performing an encrypted intersection on the first party data and the second party data, determining common nodes in the first graph and the second graph, and associating the first graph with the second graph according to the common nodes, to obtain a federated graph; learning the federated graph by using a random walk-based distributed graph embedding algorithm and determining a first graph embedding vector [PiA, PiB] starting from the first graph and a second graph embedding vector [PiA', PiB'] starting from the second graph, wherein the PiA and the PiA' are embedding vectors of each first graph node of the first graph, and the PiB and the PiB' are embedding vectors of each second graph node of the second graph; and performing a clustering analysis on the first graph embedding vector [PiA, PiB] and the second graph embedding vector [PiA', PiB'] of the federated graph on the basis of a federated clustering method to obtain a clustering result.

In a second aspect, a federated graph clustering device based on distributed graph embedding is provided, including: a constructing module, configured to construct a first graph on the basis of first party data, and construct a second graph on the basis of second party data; an associating module, configured to perform an encrypted intersection on the first party data and the second party data, determine common nodes in the first graph and the second graph, and associate the first graph with the second graph according to the common nodes to obtain a federated graph; a learning module, configured to perform learning on the federated graph by using a random walk-based distributed graph embedding algorithm and determine a first graph embedding vector [PiA, PiB] starting from the first graph and a second graph embedding vector [PiA', PiB'] starting from the second graph, wherein the PiA and the PiA' are embedding vectors of each first graph node of the first graph, and the PiB and the PiB' are embedding vectors of each second graph node of the second graph; and a clustering module, configured to perform clustering analysis on the first graph embedding vector [PiA, PiB] and the second graph embedding vector [PiA', PiB'] of the federated graph on the basis of a federated clustering method to obtain a clustering result.

In a third aspect, a federated graph clustering device based on distributed graph embedding is provided, including: at least one processor; and a memory communicatively coupled to the at least one processor; wherein the memory stores instructions executable by the at least one processor, the instructions being executed by the at least one processor to cause the at least one processor to perform the method of the first aspect.

In a forth aspect, a computer-readable storage medium is provided, the computer-readable storage medium storing a program which, when executed by a multi-core processor, causes the multi-core processor to perform the method of the first aspect.

One of the advantages of the above aspects is that it may enable the learning of the graph embedding vectors of the federated graph in the case where the first party data and the second party data are private data to each other by utilizing the distributed graph embedding algorithm, and the dimensionality of the topological characteristics of the graph structure of the federated graph may be reduced to a matrix, lowering computational complexity through the analysis of the matrix to improve the effectiveness and efficiency of the calculation of the federated graph.

Other advantages of this application will be described in more detail in conjunction with the following description and accompanying drawings.

It should be understood that the above description is merely a brief summary of the technical schemes of this application so that the technical means of this application can be more clearly understood and thus may be embodied in accordance with the content of this specification. In an effort to enable a clear and easy understanding of the above and other purposes, features and advantages of this application, the detailed description of this application are hereby described below by way of example.

BRIEF DESCRIPTION OF DRAWINGS

These and other advantages and benefits herein will be apparent to those skilled in the art with the reading of the detailed description of the following exemplary embodiments. The accompanying drawings are intended only to illustrate the exemplary embodiments and not intended to limit this application. While like characters represent like components throughout the drawings, in which.

In the accompanying drawings, like or corresponding characters represent like or corresponding parts.

DETAILED DESCRIPTION

The exemplary embodiments of the present disclosure will be described in more detail below with reference to the accompanying drawings. Although the exemplary embodiments of the present disclosure are depicted in the accompanying drawings, it should be understood that the present disclosure may be implemented in various forms without being limited by the embodiments set forth herein. Rather, these embodiments are provided to enable a more thorough understanding of the present disclosure and to enable a complete delivery of the scope of the present disclosure to those skilled in the art.

In the description of the embodiments of this application, it should be understood that terms such as "including" or "having" are intended to indicate the presence of the features, numerals, steps, acts, components, parts, or the combinations thereof disclosed in this specification, and are not intended to exclude the possible presence of one or more other features, numerals, steps, acts, components, parts, or the combinations thereof.

Unless otherwise noted, "/" represents "or", e.g., "A/B" may represent "A or B"; "and/or" herein is merely an associative relationship describing associated objects, representing that three types of relationships may exist, e.g., "A and/or B" may represent cases of: A alone, both A and B, and B alone.

The terms "first", "second", and the like, are used for descriptive purposes only, and are not to be construed as indicating or implying relative importance or implicitly specifying the number of the indicated technical features. Thereby, a feature defined with "first", "second", and the like, may explicitly or implicitly include one or more of the feature. In the description of the embodiments of this application, "multiple" means two or more unless otherwise noted.

All codes in this application are exemplary, and various variants will occur to those skilled in the art according to factors such as the used programming language, specific requirements, personal habits, and the like, without departing from the ideas of this application.

In addition, it is also needed to be noted that the embodiments and the features in the embodiments in this application may be combined with one another without interference. This application will be described in detail below with reference to the accompanying drawings and in conjunction with the embodiments.

Figure 1:
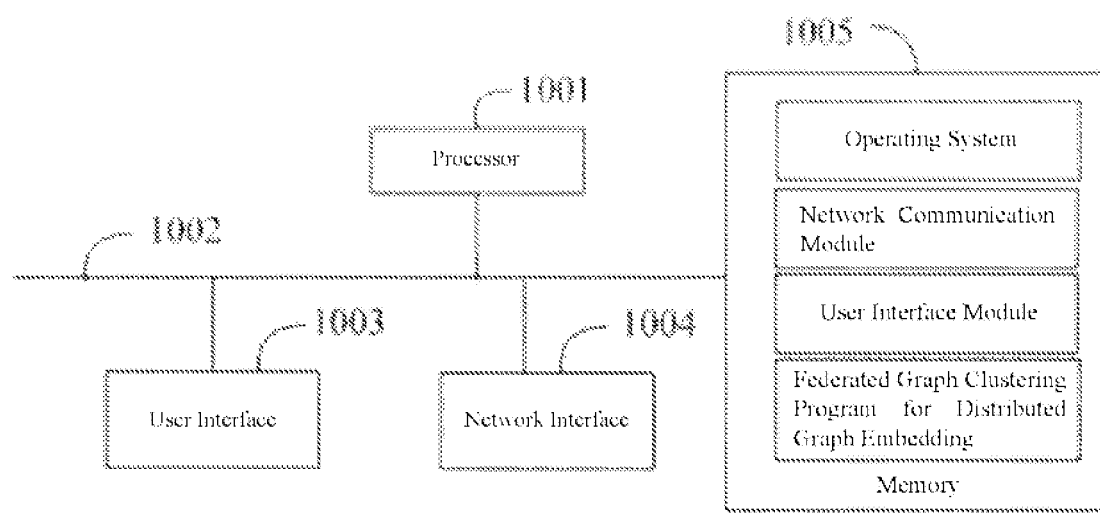
FIG. 1 is a structural schematic diagram of federated graph clustering equipment based on distributed graph embedding, in accordance with an embodiment of this application.

As shown in FIG. 1, FIG. 1 is a structural schematic diagram of a hardware operating environment involved in an embodiment of this application.

It is needed to be noted that FIG. 1 may be a structural schematic diagram of the hardware operating environment of the federated graph clustering equipment based on distributed graph embedding. The federated graph clustering equipment based on distributed graph embedding of this application may be terminal equipment such as a PC, a portable computer and the like.

As shown in FIG. 1, the federated graph clustering equipment based on distributed graph embedding may include: a processor 1001 such as a CPU, a network interface 1004, a user interface 1003, a memory 1005, and a communication bus 1002, wherein the communication bus 1002 is used to enable connected communication between these components. The user interface 1003 may include a display, an input unit such as a keyboard, and optionally the user interface 1003 may also include a standard wired interface and wireless interface. The network interface 1004 may optionally include a standard wired interface and wireless interface (such as WI-FI interface). The memory 1005 may be a high-speed RAM memory or a non-volatile memory, such as a disk memory. The memory 1005 optionally may also be a storage device independent of the aforementioned processor 1001.

It may be understood by those skilled in the art that the structure of the federated graph clustering equipment based on distributed graph embedding illustrated in FIG. 1 does not define the federated graph clustering equipment based on distributed graph embedding, and more or fewer components than illustrated or a combination of certain components or a different arrangement of components may be included.

As shown in FIG. 1, the memory 1005, as a computer storage medium, may include an operating system, a network communication module, a user interface module, and a federated graph clustering program for distributed graph embedding, wherein the operating system is a program that manages and controls the hardware and software resources of the federated graph clustering equipment based on distributed graph embedding, supporting the operation of the federated graph clustering program based on distributed graph embedding as well as other software or programs.

In the federated graph clustering equipment based on distributed graph embedding shown in FIG. 1, the user interface 1003 is mainly used to receive requests, data, and the like sent by a first terminal, a second terminal, and a supervisory terminal; the network interface 1004 is mainly used to connect to a backend server for data communication with the backend server; and the processor 1001 may be used to invoke the federated graph clustering program based on distributed graph embedding stored in the memory 1005 and perform the following operations:

constructing a first graph on the basis of a first party data, and constructing a second graph on the basis of a second party data; performing an encrypted intersection on the first party data and the second party data, determining common nodes in the first graph and the second graph, and associating the first graph with the second graph according to the common nodes to obtain a federated graph; learning the federated graph by using a random walk-based distributed graph embedding algorithm and determining a first graph embedding vector [PiA, PiB] starting from the first graph and a second graph embedding vector [PiA', PiB'] starting from the second graph, wherein the PiA and the PiA' are embedding vectors of each first graph node of the first graph, and the PiB and the PiB' are embedding vectors of each second graph node of the second graph; and performing a clustering analysis on the first graph embedding vector [PiA, PiB] and the second graph embedding vector [PiA', PiB'] of the federated graph on the basis of a federated clustering method to obtain a clustering result.

Therefore, the learning of the graph embedding vectors of the federated graph in the case where the first party data and the second party data are private data to each other may be implemented by utilizing the distributed graph embedding algorithm, and the dimensionality of the topological characteristics of the graph structure of the federated graph may be reduced to a matrix, lowering computational complexity through the analysis of the matrix to improve the effectiveness and efficiency of the calculation of the federated graph.

Figure 2:
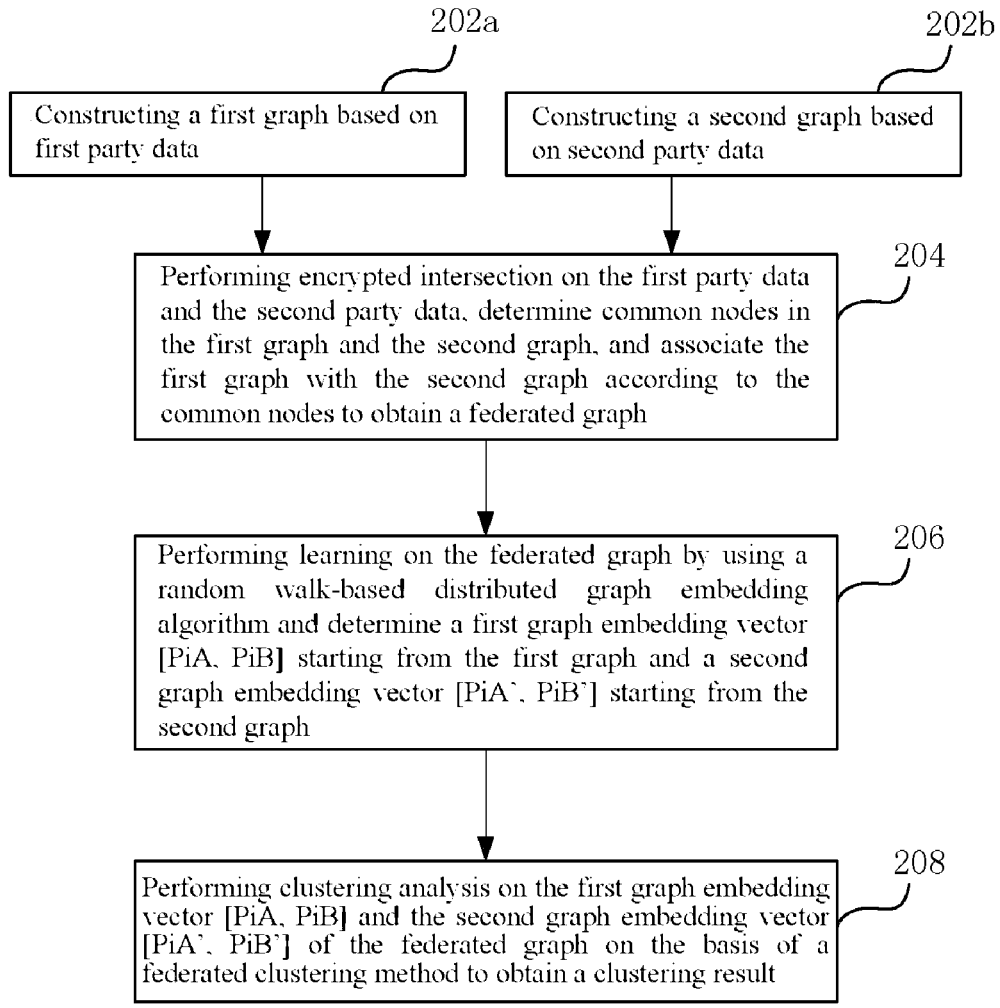
FIG. 2 is a flowchart of a federated graph clustering method based on distributed graph embedding, in accordance with an embodiment of this application.

FIG. 2 is a flowchart of a federated graph calculating method based on distributed graph embedding, in accordance with an embodiment of this application, and in the flowchart the implementing subject may be, from an equipment perspective, one or more electronic devices, and more specifically, a processing module; and the implementing subject may accordingly be, from a program perspective, a program loaded on these electronic devices. In this embodiment, the implementing subject of the method may be the processor in the embodiment shown in FIG. 1.

As shown in FIG. 2, the method provided by this embodiment may include the following steps:

202a—constructing a first graph based on first party data;
202b—constructing a second graph based on second party data.

It may be understood that the first party data and the second party data are private data of the first party and the second party, respectively, and then the first party constructs the first graph based on the first party data, and the second party constructs the second graph based on the second party data.

Figure 3:
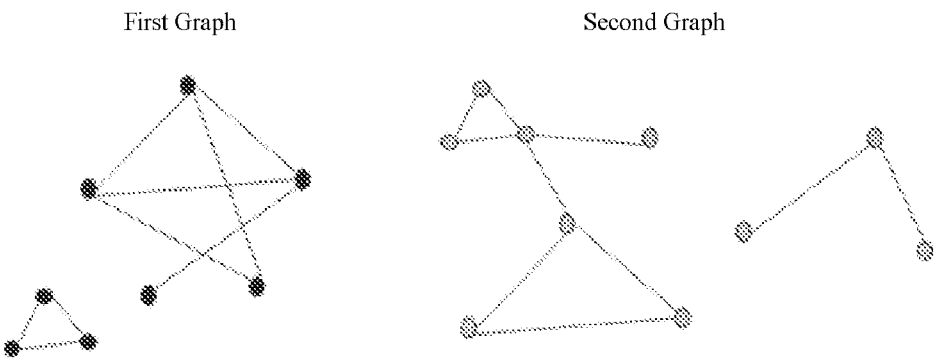
FIG. 3 is a schematic diagram of the first graph and the second graph, in accordance with an embodiment of this application.

Referring to FIG. 3, the entity nodes and edge relationship of the graphs may be defined according to the actual task to respectively construct the first graph A and the second graph B based on the data owned by the two parties.

In some embodiments, the nodes of the first graph are first party users and/or first party merchants, and the edges of the first graph are determined according to the associative relationship between the nodes of the first graph; the nodes of the second graph are second party users and/or second party merchants, and the edges of the second graph are determined according to the associative relationship between the nodes of the second graph. For example, the above associative relationship may be any kind of associative relationships between the nodes, such as a transaction relationship between the users and the merchants, a transfer relationship between the users and a transfer relationship between the merchants.

204—performing encrypted intersection on the first party data and the second party data, determining common nodes in the first graph and the second graph, and associating the first graph with the second graph according to the common nodes to obtain a federated graph; it may be understood that the association of the first graph and the second graph may be established by finding the common nodes in the first graph and the second graph, wherein the common nodes refer to the same entity nodes that commonly exist in the first graph and the second graph, such as a same user, a same merchant, and the like.

Figure 4:
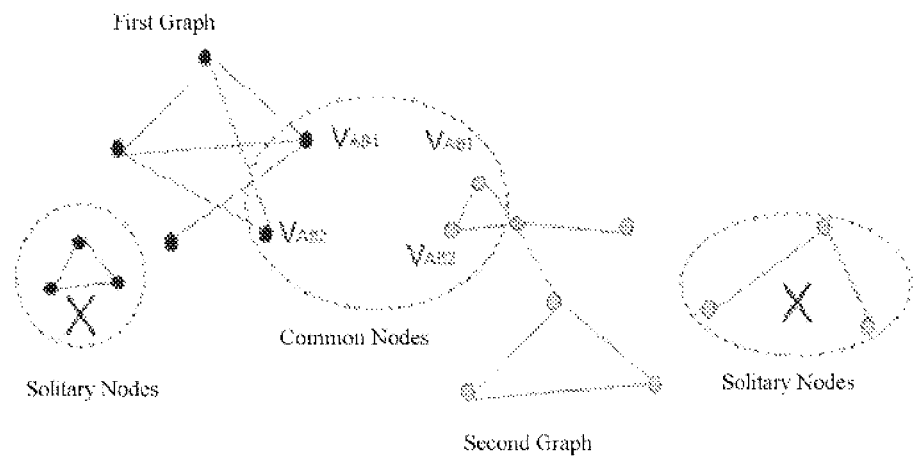
FIG. 4 is a schematic diagram of a federated graph, in accordance with an embodiment of this application.

Referring to FIG. 4, assuming that $V_{AB1}$ in the first graph A and $V_{AB1}$ in the second graph are common nodes, and $V_{AB2}$ in the first graph A and $V_{AB2}$ in the second graph are common nodes, the first graph A and the second graph B may be associated to form the federation graph accordingly.

In some embodiments, the common nodes in a first graph network and a second graph network may be aligned according to property information of the merchants and/or the users. For example, the common nodes corresponding to a same user may be determined by user property information such as a cell phone number, an email address, and the like.

In some embodiments, after associating the first graph with the second graph, solitary nodes in the first graph and the second graph that have no direct or indirect associative relationship with the common nodes may also be filtered out to obtain the federated graph.

Referring to FIG. 4, since the aforementioned solitary nodes are not capable of perform federated training across the first graph and the second graph, the solitary nodes in the first graph A and the second graph B may be filtered out to form a federation graph for graph computation of the two parties.

206—performing learning on the federated graph by using a random walk-based distributed graph embedding algorithm and determining a first graph embedding vector [PiA, PiB] starting from the first graph and a second graph embedding vector [PiA', PiB'] starting from the second graph; the PiA and the PiA' are embedding vectors of individual first graph nodes of the first graph, and the PiB and the PiB' are embedding vectors of individual second graph nodes of the second graph.

Graph Embedding is a method of mapping graph nodes (high-dimensional vectors) into low-dimensional vectors to obtain a unique representation of each node, and the vectors of which are then used for implementing tasks such as recommendation, classification, or prediction. A random walk-based graph embedding algorithm firstly performs multiple samples on the nodes on the graph using the random walk algorithm to obtain some sequences of nodes, and then the vector representations of individual nodes of the graph are generated according to the sequences of nodes to obtain the graph embedding vectors. Specifically, in this embodiment, since the first graph embedding vector [PiA, PiB] includes a first graph portion PiA and a second graph portion PiB, wherein the first graph portion PiA requires to be obtained by sampling on the first graph by the first party, and the second graph portion PiB requires to be obtained by sampling on the second graph by the second party, and thus there is a need to distribute the above graph embedding method over the first graph and the second graph using a distributed graph embedding algorithm to obtain the first graph portion and the second graph portion, respectively.

Figure 5:
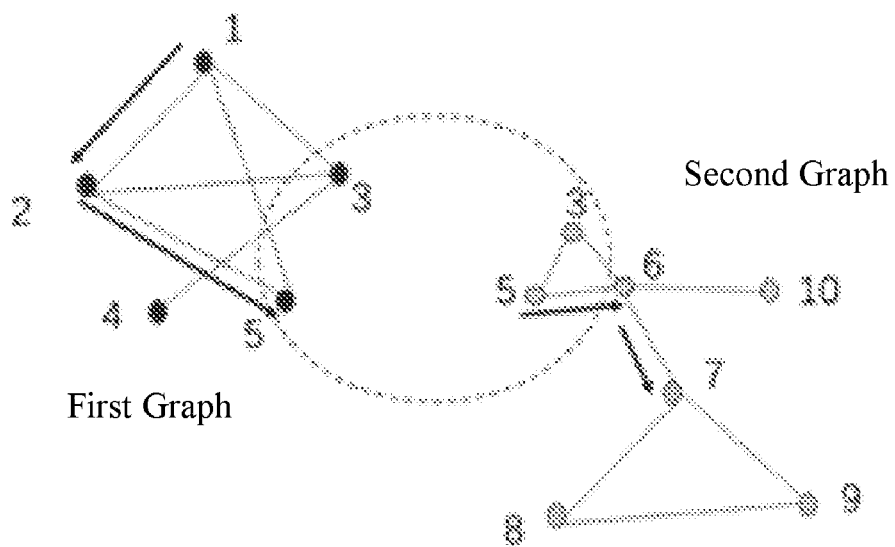
FIG. 5 is a schematic diagram of another federated graph, in accordance with an embodiment of this application.

One may first define the step count of random walk for each node in the graph embedding as M. For each first graph node, it may walk from the first graph through the common node towards the second graph when randomly walking M steps, taking Mia steps in the first graph A and (M−Mia) steps in the second graph B. For example, referring to FIG. 5, assume that one walks M=4 steps starting from node 1 through nodes 1-2-5-6-7, wherein 2 steps (1-2-5) are walked in the first graph A, and 2 steps (5-6-7) are walked in the second graph B.

In some embodiments, the above 204 further includes: performing random walk for multiple times on the federated graph with the first graph nodes as starting nodes, wherein a first party determines the PiA according to walk paths on the first graph and a second party determines the PiB according to matched walk paths on the second graph; and performing the random walk for multiple times on the federated graph with the second graph nodes as the starting nodes, wherein the second party determines the PiB' according to the walk paths on the second graph and the first party determines the PiA' according to the matched walk paths on the first graph.

The matched walk paths on the second graph described above may be obtained after performing multiple random walks on the second graph starting from the common nodes between the first graph and the second graph.

The matched walk path on the first graph described above may be obtained after performing multiple random walks on the first graph starting from the common nodes between the first graph and the second graph.

It may be understood that in the federated graph, since the first party is not aware of the paths of the random walk of the second graph, and similarly, the second party is not aware of the paths of the random walk of the first graph, in the case of the random walk starting from the first graph nodes, the PiA portion of the first graph embedding vector may be obtained by the first party, and the PiB portion of the first graph embedding vector may be obtained by the match performed by the second party with respect to the task of the remaining walks handed over by the first party. Similarly, in the case of the random walk starting from the second graph nodes, the PiB' portion of the second graph embedding vector may be obtained by the second party, and the PiA' portion of the second graph embedding vector may be obtained by the match performed by the first party with respect to the task of the remaining walks handed over by the second party.

In some embodiments, determining the first graph portion PiA of the first graph embedding vector includes:

defining a random walk step count M, wherein the first party performs the random walk on the first graph with any one of the first graph nodes as a starting node and stops walking when walks to any one of the common nodes, and recording a first graph walk step count Mia, an identification $Vab_i$ of the common nodes walked to, and each of the first graph nodes passed through in this walk; after performing the random walk for X times, recording, for each random walk, the first graph walk step count Mia and a frequency of each of the first graph nodes that has been walked to, and obtaining a first graph node frequency matrix corresponding to each first graph walk step counts Mia; and performing a matrix accumulation calculation on the first graph node frequency matrix corresponding to the individual first graph walk step counts Mia, which is then divided by a random walk count X to obtain a first graph portion PiA of the first graph embedding vector.

Specifically, obtaining the first graph node frequency matrix corresponding to individual first graph walk step counts Mia includes:

walking 1 step to reach the common node:
Mia=1, frequency matrix: PA_1=[$Pa_1\_1$, $Pa_2\_1$, $Pa_3\_1$, $Pa_4\_1$, . . . , $Pa_{Na}\_1$];

walking 2 steps to reach the common node:
Mia=2, frequency matrix: PA_2=[$Pa_2\_2$, $Pa_2\_2$, $Pa_3\_2$, $Pa_4\_2$, . . . , $Pa_{Na}\_2$];
. . .

walking M steps to reach the common node:
Mia=M, frequency matrix: PA_M=[$Pa_M\_M$, $Pa_2\_M$, $Pa_3\_M$, $Pa_4\_M$, $Pa_{Na}\_M$];

overall, the frequency matrix PA_Mia of taking Mia steps from the first graph to the common node $Vab_i$ may be obtained, wherein the value of the Mia is an integer between a total step count M and a minimum step count m of the distance from the starting node to the common node;

$$PA\_Mia = [Pa_{n1}\_Mia, n1 = 1, 2, \ldots, Na] = [Pa_1\_Mia, P_2\_Mia, \ldots, Pa_{Na}\_Mia];$$

wherein the first graph includes Na $Pa_{n1}$ nodes; the value of the Mia is an integer between a total step count M and a minimum step count m of the distance from the starting node to the common node; and the $Pa_n\_Mia$ is the number of times that the node $Pa_n$ of the first graph is passed through after the random walk of Mia steps for X times from the starting node.

Further, the first graph portion PiA of the first graph embedding vector may be calculated with the following equation:

$$PiA = \sum\nolimits_{Mia=m}^{M} [PA\_Mia]/X = \left[\sum\nolimits_{Mia=m}^{M} P_{a1\_Mia}/X, \sum\nolimits_{Mia=m}^{M} P_{a2\_Mia}/X, \ldots, \sum\nolimits_{Mia=m}^{M} P_{aNa\_Mia}/X\right].$$

In some embodiments, determining the second graph portion PiB of the first graph embedding vector includes the following steps:

The first party, during or after the random walk for X times, sends the identification $Vab_i$ of each of the common nodes walked to and all of corresponding first graph walk step counts Mia to the second party. For example, the second party receives from the first party multiple combinations of ($Vab_i$, a remaining second graph walk step count Mib=M−Mia).

Further, the second party determines a graph embedding vector $PiB\_Vab_i$ of Mib=(M−Mia) steps corresponding to the random walk on the second graph starting from the each common node $Vab_i$; for example, after walking Mia steps on the first graph A to the common node $Vab_i$, one continues to walk Mib steps on the second graph with the common node $Vab_i$ as the starting point, and the frequency matrix is: $PB\_Mib\_Vab_i$=[$Pb_1\_Mib$, $Pb_2\_Mib$, . . . , $Pb_{Nb}\_Mia$]; furthermore, $PiB\_Vab_i$ is obtained by the summation of the frequency matrix of the each common node $Vab_i$ corresponding to a plurality of second graph walk step counts Mib.

It may be understood that the graph embedding vector PiB_Vab$_i$ corresponding to the above common node Vab$_i$ may also be pre-calculated from the second graph.

Further, all of the graph embedding vectors PiB_Vab$_i$ corresponding to the common node Vab$_i$ are summed up and divided by a sub-walk count X$_1$ to obtain the second graph portion PiB of the first graph embedding vector; for example, PiB is obtained with the following equation: PiB: PiB=$\Sigma_{i=1}^{Nab}$PiB_Vab$_i$/X$_1$;

wherein the sub-walk count X$_1$ is the number of times that the second graph is walked to during the random walk for X times.

Likewise, the random walk may be performed for multiple times on the federated graph with the second graph nodes as the starting nodes, causing the second party determine the PiB' according to the walk paths on the second graph and the first party determine the PiA' according to the matched walk paths on the first graph to obtain the above second graph embedding vector [PiA', PiB'].

Specifically, a random walk step count M' may be defined, wherein the second party performs the random walk on the second graph with any one of the second graph nodes as a starting node and stops walking when walks to any one of the common nodes, and recording a second graph walk step count Mia', the identification Vab$_i$ of the common node that has walked to, and each of the second graph nodes passed through in this walk; after performing the random walk for X' times, recording, for each random walk, the second graph walk step count Mia' and the frequency of each of the second graph nodes that has been walked to, and obtaining a second graph node frequency matrix corresponding to each second graph walk step counts Mia'; and performing a matrix accumulation calculation on the second graph node frequency matrix corresponding to the individual second graph walk step counts Mia', which is then divided by a random walk count X' to obtain a second graph portion PiB' of the second graph embedding vector.

In some embodiments, the first party determines the PiA' according to the matched walk paths on the first graph, including:

Sending, by the second party, sending the identification Vab$_i$ of each of the common nodes walked to and all of corresponding second graph walk step counts Mia' to the first party during or after the random walk for X' times; determining, by the first party, a graph embedding vector PiA'_Vab$_i$ of (M'−Mia') steps corresponding to the random walk on the first graph starting from the each common node Vab$_i$; and performing an accumulation on all of the graph embedding vectors PiA'_Vab$_i$ corresponding to the common node Vab$_i$, which is then divided by a sub-walk count X'$_1$ to obtain a first graph portion PiA' of the second graph embedding vector; wherein the sub-walk count X'$_1$ is the number of times that the first graph is walked to during the random walk for X' times.

In some embodiments, the second graph node frequency matrix corresponding to the individual walk step counts Mia' includes:

$$PB\_Mia' = [Pb_{n2}\_Mia', n2 = 1, 2, ..., Nb];$$

wherein the second graph includes Nb Pb$_{n2}$ nodes; the value of the Mia' is an integer between a total step count M' and a minimum step count m' of the distance from the starting node to the common node; and the Pb$_2$_Mia' is the number of times that the second graph node Pb$_{n2}$ is passed through after the random walk of Mia' steps for X' times from the starting node.

In some embodiments, the PiB' is calculated with the following equation:

$$PIB' = \sum_{Mia'=m'}^{M'} [PB\_Mia']/$$

$$X = \left[\sum_{Mia'=m'}^{M'} P_{a1\_Mia'}/X', ..., \sum_{Mia'=m'}^{M'} P_{bNb\_Mia'}/X'\right].$$

In some embodiments, the PiA' is calculated with the following equation:

$$PiA': PiA' = \sum_{i=1}^{Nab} PiA'\_Vab_i/X'.$$

And 208—performing clustering analysis on the first graph embedding vector [PiA, PiB] and the second graph embedding vector [PiA', PiB'] of the federated graph on the basis of a federated clustering method to obtain a clustering result.

In some embodiments, the above 208 may further include: performing the clustering analysis on the first graph portion PiA of the first graph embedding vector and the first graph portion PiA' of the second graph embedding vector on the basis of the federated clustering method to obtain a first cluster of the first graph portion of the federated graph; performing the clustering analysis on the second graph portion PiB of the first graph embedding vector and the second graph portion PiB' of the second graph embedding vector on the basis of the federated clustering method to obtain a second cluster of the first graph portion of the federated graph; and filtering cross-graph clusters based on the first cluster and the second cluster to obtain target clusters with a higher degree of clustering.

In one example, an embodiment of this application may be used for risk identification in scenarios such as organized transaction fraud among payment service providers; taking the mining of defrauded users of transaction users using payment platform A and Yunshanfu as an example, assume that there is currently a fraud risk that a merchant performs transaction arbitrage and money laundering by one payment channel and then performs transfers by another payment channel, and the association of the transaction fraud is realized by the following steps:

1. Constructing a first graph on the basis of first party data, and constructing a second graph on the basis of second party data;

for example, the transfers between the users, the merchants and payment platform A form the first graph, and the transfers between the users, the merchants and the users of payment platform B form the second graph, the entities of which are user and merchant nodes, and the relationships of which are transfer relationship between the users, as well as transaction payment relationship between the users and merchants.

2. Performing encrypted intersection on the first party data and the second party data, determining common nodes in the first graph and the second graph, and associating the first graph with the second graph according to the common nodes to obtain a federated graph.

For example, the public users and merchants of the two payment channels are aligned by the primary key value that is user identity information and enterprise information of industry and business, and the public users are joint registered transaction users of the two payment channels, and the public merchants are aggregation payment merchants and the transaction merchants that realize mutual recognition and mutual scanning of payee's QR codes of the merchants.

3. Performing learning on the federated graph by using a random walk-based distributed graph embedding algorithm.

Define that each user or merchant node of the payment platform B walks M steps, after it walks Mia steps to reach the common node $Vab_i$, record its frequency vector Pa–Mia of taking Mia steps to the common node for multiple times, and obtain its embedding vector PiA through the weighted aggregation of the vector of taking different steps to the common node; and according to the sequence of the common nodes reached and corresponding to the vector matrix of random walk of M–Mia steps of the users of payment platform A starting from the common node associated with the matched B side, perform at an intermediate node the encrypted match of the corresponding common node $Vab_i$ and its vector matrix of random walk of (M–Ma) steps, and obtain the corresponding embedding vector PiB according to the weighted aggregation of the results of multiple matches, wherein the PiA and PiB are stored in respective data space.

Using an identical method, perform random walk starting from the user node or merchant node of payment platform A to obtain PiA' and PiB'.

4. Firstly perform clustering analysis on the first graph portions PiA and PiA' respectively using the method based on federated learning clustering analysis, and mark the clusters mined by the vectors based on the first graph; on the basis of which the intermediate node records the cluster center kernel data, and after the second graph portion PiB and PiB' are introduced, the clustering conditions of the second graph of individual nodes within the clusters are compared in order to mine the vector space clustering center kernel of the second graph, and the clusters are filtered again to obtain the strongest associated node data.

In the description of this specification, the description of reference terms such as "some possible embodiments", "some embodiments", "example", "specific example", or "some examples" means that specific features, structures, materials, or characteristics described in conjunction with the embodiment or example are included in at least one embodiment or example of this application. In this specification, schematic expressions of the above terms do not necessarily refer to a same embodiment or example. Moreover, the described specific features, structures, materials or characteristics may be combined in a suitable manner in any one or a plurality of embodiments or examples. Further, those skilled in the art may incorporate and combine different embodiments or examples and the features of the different embodiments or examples described in this specification without contradicting each other.

Furthermore, the terms "first", "second", and the like, are used for descriptive purposes only, and are not to be construed as indicating or implying relative importance or implicitly specifying the number of the indicated technical features. Thereby, a feature defined with "first", "second", and the like, may explicitly or implicitly include at least one such feature. In the description of this application, "plurality" means at least two, e.g., two, three, etc., unless otherwise expressly and specifically defined.

Any description of process or method described in the flowchart or otherwise herein may be understood to represent a module, fragment, or part of code including one or more executable instructions for implementing the steps of a particular logical function or process, and the scope of a preferred embodiment of this application includes additional implementations, wherein the functions may not be implemented in the shown or discussed order, including in a reverse order or a substantially simultaneous manner according to the involved functions, which should be understood by those skilled in the art the embodiments of this application belong to.

With respect to the method flowcharts of the embodiments of this application, certain operations are described as different steps performed in a certain order. Such flowcharts are descriptive rather than limitations. Certain steps described herein may be grouped together and performed in a single operation, and certain steps may be split into a plurality of sub-steps, and certain steps may be performed in a different order than shown herein. The individual steps illustrated in the flowcharts may be implemented in any manner by any circuit structure and/or physical mechanism (e.g., hardware (e.g., processor or chip-implemented logic functions), software, and the like, running on computer equipment, and/or any combination thereof).

Figure 6:
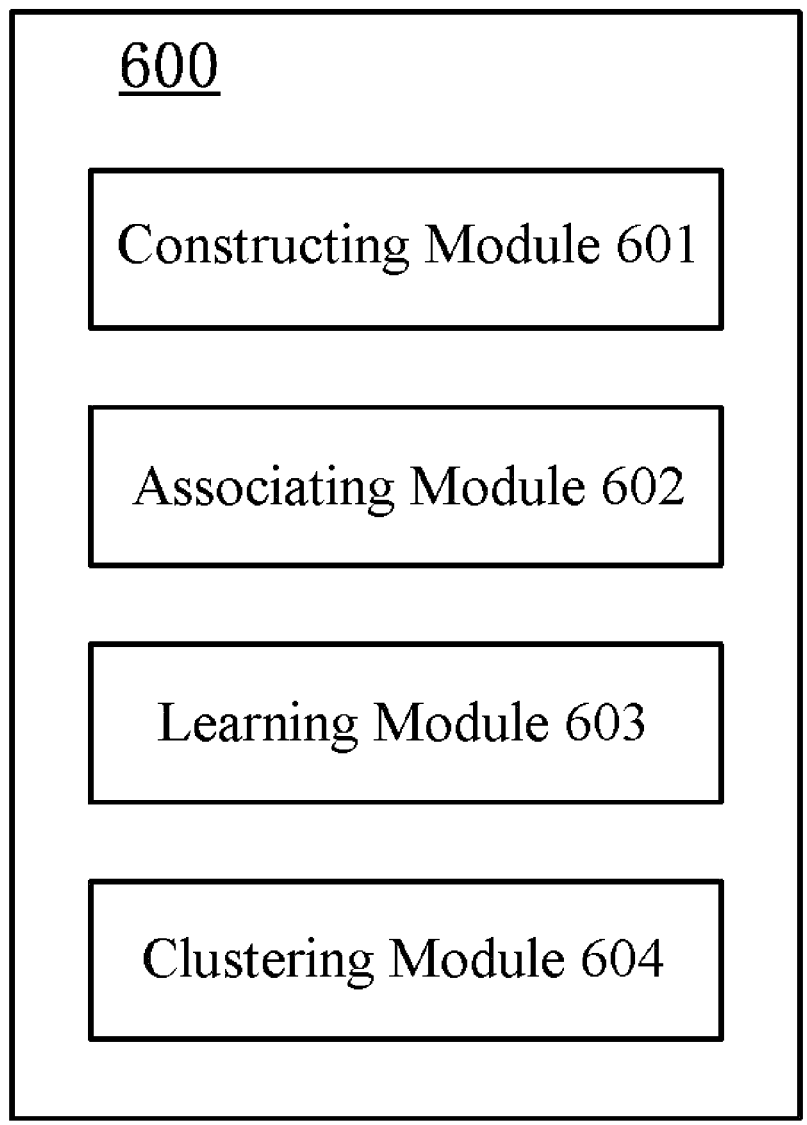
FIG. 6 is a structural schematic diagram of a federated graph clustering device based on distributed graph embedding, in accordance with an embodiment of this application.

Based on a same technical concept, an embodiment of this application further provide a federated graph clustering device based on distributed graph embedding for implementing the federated graph clustering method based on distributed graph embedding provided by any embodiment mentioned above. FIG. 6 is a structural schematic diagram of a federated graph clustering device based on distributed graph embedding provided by an embodiment of this application.

As shown in FIG. 6, the device 600 includes:

a constructing module 601, configured to construct a first graph on the basis of first party data, and construct a second graph on the basis of second party data;

an associating module 602, configured to perform encrypted intersection on the first party data and the second party data, determine common nodes in the first graph and the second graph, and associate the first graph with the second graph according to the common nodes to obtain a federated graph;

a learning module 603, configured to perform learning on the federated graph by using a random walk-based distributed graph embedding algorithm and determine a first graph embedding vector [PiA, PiB] starting from the first graph and a second graph embedding vector [PiA', PiB'] starting from the second graph, wherein the PiA and the PiA' are embedding vectors of individual first graph nodes of the first graph, and the PiB and the PiB' are embedding vectors of individual second graph nodes of the second graph; and a clustering module 604, configured to perform clustering analysis on the first graph embedding vector [PiA, PiB] and the second graph embedding vector [PiA', PiB'] of the federated graph on the basis of a federated clustering method to obtain a clustering result.

It is needed to be noted that the device in the embodiment of this application may implement the individual processes of the embodiment of the aforementioned method and achieve same effects and functions, which will not be given in detail herein.

Figure 7:
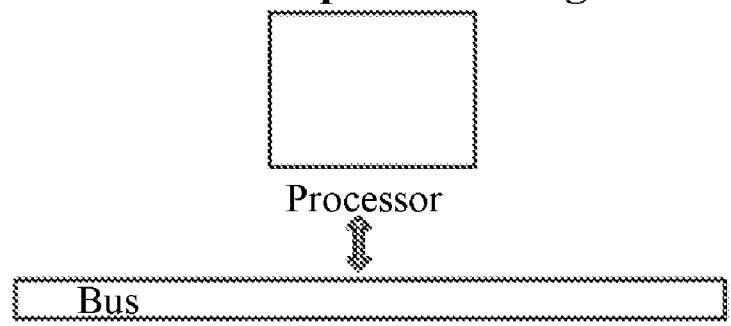
FIG. 7 is a structural schematic diagram of a federated graph clustering device based on distributed graph embedding, in accordance with another embodiment of this application.

FIG. 7 is the federated graph clustering device based on distributed graph embedding, in accordance with an embodiment of this application, for performing the federated graph clustering method based on distributed graph embedding illustrated in FIG. 2, the device including: at least one processor; and a memory communicatively coupled to the at least one processor; wherein the memory stores instructions executable by the at least one processor, the instructions being executed by the at least one processor to cause the at least one processor to perform the method of the above mentioned embodiments.

In accordance with some embodiments of this application, there is provided a non-volatile computer storage medium of the federated graph clustering method based on distributed graph embedding having computer-executable instructions stored thereon, and the computer-executable instructions are configured to perform, when run by a processor, the method described in the above mentioned embodiments.

The various embodiments in this application are described in a progressive manner with same or similar portions of the various embodiments being sufficient to refer to each other, and each embodiment focuses on differences from other embodiments. In particular, with respect to the embodiments of the device, equipment, and computer-readable storage medium, the descriptions of which are simplified because they are substantially similar to the embodiments of the method, and it may be sufficient to refer to some of the descriptions of the embodiments of the method for what is relevant.

The device, equipment, and computer-readable storage medium provided in the embodiments of this application are in one-to-one correspondence with the method, and therefore, the device, equipment, and computer-readable storage medium also have beneficial technical effects similar to their corresponding method. Since the beneficial technical effects of the method have been described in detail above, the beneficial technical effects of the device, equipment, and computer-readable storage medium will not be given in detail herein.

It should be understood by those skilled in the art that the embodiments of this application may be provided as a method, system, or computer program product. Thus, this application may take the form of a fully hardware embodiment, a fully software embodiment, or an embodiment that combines software and hardware aspects. Also, this application may take the form of a computer program product implemented on one or more computer-readable storage medium (including, but not limited to, disk memory, CD-ROM, optical memory, and the like) that contains computer-readable program code therein.

This application is described with reference to the flowcharts and/or block diagrams of the method, equipment (system), and computer program product according to the embodiments of this application. It should be understood that each process and/or block in the flowcharts and/or block diagrams, and combinations of the processes and/or blocks in the flowcharts and/or block diagrams may be implemented by computer program instructions. These computer program instructions may be provided to the processor of a general-purpose computer, a dedicated computer, an embedded processor, or other programmable data processing equipment to produce a machine such that the instructions executed by the processor of the computer or other programmable data processing equipment produce a device for implementing the functions specified in one process or multiple processes of the flowcharts and/or one block or multiple blocks of the block diagrams.

These computer program instructions may also be stored in a computer-readable memory capable of directing the computer or other programmable data processing equipment to operate in a particular manner, such that the instructions stored in the computer-readable memory produce an article of manufacture including an instruction device that implements the functions specified in one process or multiple processes of the flowcharts and/or one block or multiple blocks of the block diagrams.

These computer program instructions may also be loaded onto the computer or other programmable data processing equipment such that a series of operational steps are performed on the computer or other programmable equipment to produce computer-implemented processing, such that the instructions executed on the computer or other programmable equipment provide steps for implementing the functions specified in one process or multiple processes of the flowcharts and/or one block or multiple blocks of the block diagrams.

In one typical configuration, computing equipment includes one or more processors (CPUs), input/output interfaces, network interfaces, and memory.

The memory may include the forms such as non-permanent memory, random access memory (RAM) and/or non-volatile memory in computer-readable medium, such as read-only memory (ROM) or flash RAM. The memory is an example of the computer-readable medium.

The computer-readable medium includes permanent and non-permanent, removable and non-removable media, which may implement information storage by any method or technique. The information may be computer-readable instructions, data structures, modules of the program, or other data. Examples of storage medium of the computer include, but are not limited to, phase-change RAM (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read-only memory (CD-ROM), Digital Versatile Disc (DVD) or other optical storage, cassette tape, magnetic disk storage or other magnetic storage, or any other non-transfer medium that can be used to store information which may be accessed by the computing equipment. Furthermore, although the operations of the method of this application are described in a particular order in the accompanying drawings, it is not required or implied that these operations have to be performed in the particular order or that all of the shown operations have to be performed in order to achieve the desired results. Additionally or alternatively, one may omit certain steps, combine a plurality of steps into one step to perform, and/or split one step into a plurality of steps to perform.

Although the spirit and principles of this application have been described with reference to several specific embodiments, it should be understood that this application is not limited to the disclosed specific embodiments, that the division of various aspects do not mean that the features in these aspects cannot be combined for benefit, and that such a division is only for ease of presentation. This application is intended to encompass various modifications and equivalent arrangements included within the spirit and scope of the appended claims.

The invention claimed is:

1. A federated graph clustering method based on distributed graph embedding, comprises:
   constructing a first graph on the basis of a first party data, and constructing a second graph on the basis of a second party data;
   performing an encrypted intersection on the first party data and the second party data, determining common nodes in the first graph and the second graph, and associating the first graph with the second graph according to the common nodes, to obtain a federated graph;

learning the federated graph by using a random walk-based distributed graph embedding algorithm and determining a first graph embedding vector [PiA, PiB] starting from the first graph and a second graph embedding vector [PiA', PiB'] starting from the second graph, wherein the PiA and the PiA' are embedding vectors of each first graph node of the first graph, and the PiB and the PiB' are embedding vectors of each second graph node of the second graph; and performing a clustering analysis on the first graph embedding vector [PiA, PiB] and the second graph embedding vector [PiA', PiB'] of the federated graph on the basis of a federated clustering method, to obtain a clustering result, wherein determining the first graph embedding vector [PiA, PiB] and the second graph embedding vector [PiA', PiB'], comprises:

performing random walk for multiple times on the federated graph with the first graph node as starting node, the first party determines the PiA according to walk paths on the first graph, the second party determines the PiB according to matched walk paths on the second graph; and performing the random walk for multiple times on the federated graph with the second graph node as the starting node, the second party determines the PiB' according to the walk paths on the second graph, the first party determines the PiA' according to the matched walk paths on the first graph, and wherein performing the random walk for multiple times on the federated graph with the first graph node as the starting node, the first party determines the PiA according to the walk paths on the first graph, comprises:

defining a random walk step count M, wherein the first party performs the random walk on the first graph with any one of the first graph nodes as a starting node and stops walking when walks to any one of the common nodes, and recording a first graph walk step count Mia, an identification $Vab_i$ of the common node that has walked to, and each of the first graph nodes passed through in this walk;

after performing the random walk for X times, recording, for each random walk, the first graph walk step count Mia and a frequency of each of the first graph nodes that has been walked to, and obtaining a first graph node frequency matrix corresponding to each first graph walk step counts Mia; and performing a matrix accumulation calculation on the first graph node frequency matrix corresponding to the individual first graph walk step counts Mia, which is then divided by a random walk count X to obtain a first graph portion PiA of the first graph embedding vector.

2. The method according to claim 1, wherein associating the first graph with the second graph according to the common nodes to obtain the federated graph further comprises:
filtering out solitary nodes in the first graph and the second graph that have no direct or indirect associative relationship with the common nodes to obtain the federated graph.

3. The method of claim 1, wherein the first party data and the second party data are isolated from each other.

4. The method of claim 1, wherein,
the nodes of the first graph are first party users and/or first party merchants, and edges of the first graph are determined according to the associative relationship between the first graph nodes; and
the nodes of the second graph are second party users and/or second party merchants, and the edges of the second graph are determined according to the associative relationship between the second graph nodes.

5. The method of claim 1, wherein performing the encrypted intersection on the first party data and the second party data and determining the common nodes in the first graph network and the second graph network, comprises:
aligning the common nodes in the first graph network and the second graph network according to property information of merchants and/or users.

6. The method according to claim 1, wherein the second party determines the PiB according to the matched walk paths on the second graph, comprises:
sending, by the first party, the identification $Vab_i$ of each of the common nodes walked to and all of corresponding first graph walk step counts Mia to the second party during or after the random walk process for X times;
determining, by the second party, a graph embedding vector $PiB\_Vab_i$ of a second graph walk step count Mib corresponding to the random walk on the second graph starting from each common node $Vab_i$, wherein M=Mib+Mia; and
performing an accumulation on all of the graph embedding vectors $PiB\_Vab_i$ corresponding to the common node $Vab_i$, which is then divided by a sub-walk count $X_1$ to obtain a second graph portion PiB of the first graph embedding vector;
wherein the sub-walk count $X_1$ is the number of times that the second graph is walked to during the random walk for X times.

7. The method according to claim 1, wherein the first graph node frequency matrix corresponding to the individual first graph walk step counts Mia, comprises:

$$PA\_Mia = [Pa_{n1}\_Mia, n1 = 1, 2, ..., Na];$$

wherein the first graph comprises Na $Pa_{n1}$ nodes, and the value of the Mia is an integer between a total step count M and a minimum step count m of the distance from the starting node to the common node, and the $Pa_n\_Mia$ is the number of times that the node $Pa_n$ of the first graph is passed through after the random walk of Mia steps for X times from the starting node.

8. The method according to claim 7, wherein the PiA is calculated with the following equation:

$$PiA = \sum\nolimits_{Mia=m}^{M} [PA\_Mia]/X = \Big[\sum\nolimits_{Mia=m}^{M} P_{a1\_Mia}/X, \sum\nolimits_{Mia=m}^{M} P_{a2\_Mia}/X, ..., \sum\nolimits_{Mia=m}^{M} P_{aNa\_Mia}/X\Big].$$

9. The method according to claim 6, wherein the PiB is calculated with the following equation:

$$PiB = \sum\nolimits_{i=1}^{Nab} PiB\_Vab_i/X_1.$$

10. The method according to claim 1, wherein performing the random walk for multiple times on the federated graph with the second graph nodes as the starting nodes and the second party determining the PiB' according to the walk paths on the second graph, comprises:
- defining a random walk step count M', wherein the second party performs the random walk on the second graph with any one of the second graph nodes as a starting node and stops walking when walks to any one of the common nodes, and recording a second graph walk step count Mia', the identification $Vab_i$ of the common nodes that has walked to, and each of the second graph nodes passed through in this walk;
- after performing the random walk for X' times, recording, for each random walk, the second graph walk step count Mia' and the frequency of each of the second graph nodes that has been walked to, and obtaining a second graph node frequency matrix corresponding to each second graph walk step counts Mia'; and
- performing a matrix accumulation calculation on the second graph node frequency matrix corresponding to the individual second graph walk step counts Mia', which is then divided by a random walk count X' to obtain a second graph portion PiB' of the second graph embedding vector.

11. The method according to claim 10, wherein the first party determines the PiA' according to the matched walk paths on the first graph, comprises:
- sending, by the second party, sending the identification $Vab_i$ of each of the common nodes walked to and all of corresponding second graph walk step counts Mia' to the first party during or after the random walk for X' times;
- determining, by the first party, a graph embedding vector $PiA'\_Vab_i$ of (M'−Mia') steps corresponding to the random walk on the first graph starting from each common node $Vab_i$; and
- performing an accumulation on all of the graph embedding vectors $PiA'\_Vab_i$ corresponding to the common node $Vab_i$, which is then divided by a sub-walk count $X'_1$ to obtain a first graph portion PiA' of the second graph embedding vector;
- wherein the sub-walk count $X'_1$ is the number of times that the first graph is walked to during the random walk for X' times.

12. The method according to claim 10, wherein the second graph node frequency matrix corresponding to the individual second graph walk step counts Mia' comprises:

$$PB\_Mia' = [Pb_{n2}\_Mia', n2 = 1, 2, ..., Nb]$$

wherein the second graph comprises Nb $Pb_{n2}$ nodes, and the value of the Mia' is an integer between a total step count M' and a minimum step count m' of the distance from the starting node to the common node, and the $Pb_2\_Mia'$ is the number of times that the second graph node $Pb_{n2}$ is passed through after the random walk of Mia' steps for X' times from the starting node.

13. The method according to claim 12, wherein the PiB' is calculated with the following equation:

$$PIB' = \sum_{Mia'=m'}^{M'} [PB\_Mia']/$$
$$X = \left[\sum_{Mia'=m'}^{M'} P_{a1\_Mia'}/X', ..., \sum_{Mia'=m'}^{M'} P_{bNb\_Mia'}/X'\right].$$

14. The method according to claim 11, wherein the PiA is calculated with the following equation:

$$PiA' = \sum_{i=1}^{Nab} PiA'\_Vab_i/X'.$$

15. The method according to claim 1, wherein performing the clustering analysis on the first graph embedding vector [PiA, PiB] and the second graph embedding vector [PiA', PiB'] of the federated graph on the basis of the federated clustering method, comprises:
- performing the clustering analysis on the first graph portion PiA of the first graph embedding vector and the first graph portion PiA' of the second graph embedding vector on the basis of the federated clustering method to obtain a first cluster of the first graph portion of the federated graph;
- performing the clustering analysis on the second graph portion PiB of the first graph embedding vector and the second graph portion PiB' of the second graph embedding vector on the basis of the federated clustering method to obtain a second cluster of the first graph portion of the federated graph; and
- filtering cross-graph clusters based on the first cluster and the second cluster to obtain target clusters with a higher degree of clustering.

16. A distributed graph embedding-based federated graph clustering device, comprises:
at least one processor; and a memory communicatively coupled to the at least one processor; wherein the memory stores instructions executable by the at least one processor, the instructions being executed by the at least one processor to cause the at least one processor to perform the method of claim 1.

17. A non-transitory computer-readable storage medium, the non-transitory computer-readable storage medium storing a program which, when executed by a multi-core processor, causes the multi-core processor to perform the method of claim 1.

* * * * *